Dec. 30, 1969  D. P. CAPRIOLI  3,486,183

PIPE SCRAPER

Original Filed June 5, 1967

INVENTOR:
DANIEL P. CAPRIOLI

BY Howson & Howson

ATTYS 3,486,183
        PIPE SCRAPER
    Daniel P. Caprioli, P.O. Box 792,
        Devon, Pa. 19333
Original application June 5, 1967, Ser. No. 643,604, now
  Patent No. 3,432,871, dated Mar. 18, 1969. Divided and
  this application Mar. 10, 1969, Ser. No. 805,485
            Int. Cl. B08b 1/04
U.S. Cl. 15—104.04                                9 Claims

ABSTRACT OF THE DISCLOSURE

A hand-operated scraper is disclosed for removing paint, rust, scale or the like from the outer surface of a cylindrical workpiece such as a pipe. The scraper has a two-piece planar body in which is formed a series of elliptically-shaped apertures having aligned major axes and graduated in size, each aperture having suitable scraping edges provided therearound for engaging the outer surface of a pipe when the body is inclined at an acute angle with respect thereto. The body is split longitudinally along the major axes of the elliptical apertures and is hinged at one end for opening to receive the pipe and for closing to engage the pipe in scraping relation. In addition, a pair of handles is provided on the body for reciprocating the scraper longitudinally along the pipe and for simultaneously urging the scraping edges thereagainst to create a couple between the pipe and the edges to effect a scraping action.

---

Figures 1, 2:
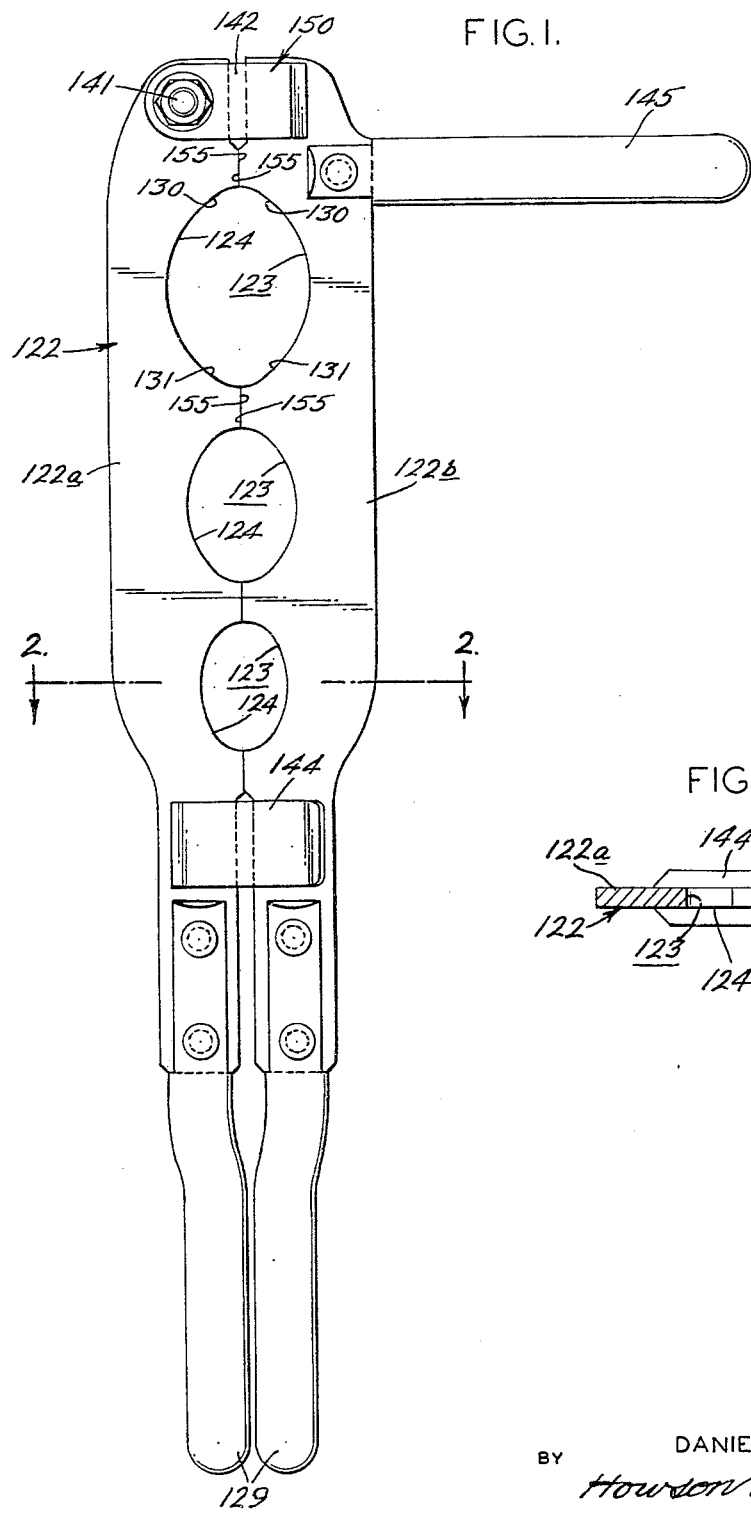

The present application is a division of my copending application Ser. No. 643,604, filed June 5, 1967, and entitled "Scraper," now U.S. Patent No. 3,432,871.

The present invention relates to scrapers, and more particularly, the present invention relates to new and useful pipe scrapers which may be used to remove unwanted foreign matter from the surface of a cylindrical workpiece such as a pipe.

Heretofore, simple and inexpensive scrapers have not been available for removing old paint, rust, scale, or the like foreign matter from the surface of a pipe or other type of cylindrical workpiece. Bladed devices such as putty knives have been used for this purpose; however, in some instances an operator may not be able to apply the necessary shearing force to effect proper removal of the foreign matter. Moreover, the effort required to effect the requisite shearing force may quickly fatigue the operator, thereby limiting his productivity.

With the foregoing in mind, it is a primary object of the present invention to provide a novel scraper for removing paint, rust, scale or the like from the outer surface of a cylindrical workpiece.

It is another object of the present invention to provide an improved scraping tool which is simple and inexpensive to manufacture.

As a further object, the present invention provides a unique pipe scraper in which the shearing force required to remove foreign matter from the surface of a pipe may be easily applied by an operator.

More specifically, the present invention provides a pipe scraper having a two-piece body in which is formed a series of elliptically-shaped apertures each having scraping edges around its inner periphery. The body is split on the major axes of the apertures and is hinged at one end for opening to receive a pipe and for closing to engage the pipe therewithin. A pair of handles is also provided on the body to permit it to be reciprocated longitudinally along the pipe while simultaneously permitting the scraping edges to be urged against opposite sides of the pipe for creating a couple to effect a scraping action along the surface of the pipe.

Other objects, features and advantages should become apparent from the following description when taken in conjunction with the accompanying drawing in which:

FIG. 1 is a front elevational view of a pipe scraper embodying the present invention; and FIG. 2 is a sectional view taken along line 2—2 of FIG. 1.

Referring now to the drawings, there is illustrated in FIG. 1 a pipe scraper having a body 122 comprising two planar pieces or members 122a and 122b. Each member 122a and 122b has a series of arcuate recesses 123, 123 of successively greater size formed therein which cooperate to define a like series of elliptically-shaped apertures 124, 124 of graduated sizes in the body 122 when the pieces are disposed in a common plane with the recesses 123, 123 in confronting relation. In the present instance, three apertures are illustrated; however, if desired, a greater or lesser number may be provided.

In order to shear foreign matter from the surface of a pipe, scraping edges are provided around the inner periphery of the apertures. To this end, each scraping edge has a first portion 130 extending around the top of the aperture 124 and a second portion 131 extending around the bottom of the aperture 124, the first and second portions engaging opposite outer sides of the pipe when the body 122 is inclined at an acute angle with respect thereto. In the present instance, the recesses 123, 123 are defined by a surface which intersects both sides of each piece at a right angle. In this manner, a scraping edge is provided which is coplanar with each side of each piece, being formed at the right-angle intersection of the surfaces. If desired however, other scraping edges may be provided. For example, the first portion of the scraping edge may be coplanar with one side of the body and the second portion of the scraping edge may be coplanar with the other side of the body, each edge being formed by a beveled surface disposed on the side of the body opposite to the side on which its respective edge portion is formed. In addition, the first and second portions of the scraping edge may be disposed in a common plane located intermediate the opposite sides of the body with each edge portion being formed by beveled surfaces disposed on opposite sides of the body. For a more complete description of these scraping edges, reference is hereby made to my copending application Ser. No. 643,604, filed June 5, 1967, now U.S. Patent No. 3,432,871, and particularly FIGS. 2–5 thereof and the accompanying description which are incorporated herein by reference.

For the purpose of receiving a pipe in scraping relation within one of the apertures, hinge means 150 is provided to interconnect the members 122a and 122b at the upper ends thereof. As may be seen in FIG. 1, the hinge means 150 comprises a pin 141 on the left-hand member 122a and a yoke 142 on the right-hand member 122b. The yoke 142 is pivotally connected to the pin 141 to thereby permit the members to pivot inwardly and outwardly in a common plane. In the present invention, inward pivotal movement of the pieces is limited by abutment surfaces 155, 155 located adjacent to the apertures and extending along the major axis thereof.

In order to permit the apertures to open wide for receiving a pipe therewithin, the pin 141 is spaced inwardly from the abutment surfaces 155, 155, and is offset from the major axes of the apertures, each member 122a and 122b being relieved at the upper end thereof to thereby permit the right-hand member 122b to swing in a counter clockwise direction above the left-hand member 122a for opening the apertures wide.

In order to reciprocate the body 122 along a pipe, a handle 129, 129 is provided on each member 122a and 122b, the handles projecting downwardly therefrom on the lower end of the body opposite to the hinge means 150. If desired, additional handle means 145 may be provided to enable an operator to apply added shearing force to the scraping edges against the surface of a pipe. As may be seen in FIG. 6, the handle means 145 projects outwardly from the right-hand member 122b at a substantially right angle to the handles 129, 129. Thus, an operator may simultaneously grasp the handles 129, 129 in one hand and the handle 145 with the other hand to effect a scraping action along a pipe.

The members 122a and 122b are secured together in use. To this end, clip means 144 is provided to releasably interconnect the members 122a and 122b to assist in maintaining the apertures in an elliptical shape and the edges in the proper scraping configuration while the scraper is being used in scraping a pipe. As may be seen in FIGS. 1 and 2, the clip means 144 is located adjacent to the handles 129, 129 and interconnects the pieces 122a and 122b by a spring clamping action.

In use, the handles 129, 129 are displaced away from each other to open the lower ends of the apertures 124, 124 for receiving a pipe in a selected one of the apertures, the aperture selected being dependent upon the diameter of the pipe. The handles may then be displaced toward each other to cause the selected aperture and its respective scraping edges to surround the pipe. A scraping action may then be effected by inclining the handles with respect to the pipe to thereby cause the scraping edges to engage against opposite outer sides thereof. Scraping pressure is adjusted by urging the handles 129, 129 selectively toward or away from the pipe while the handles are reciprocated longitudinally therealong.

While a preferred embodiment of the present invention has been described in detail, various modifications, alterations or changes may be made without departing from the spirit and scope of the present invention.

What is claimed is:

1. A pipe scraper comprising: a two-member planar body having at least one arcuate recess formed in one member and at least another arcuate recess formed in the other member, said recesses cooperating to define a substantially elliptically-shaped aperture in said body when said members are disposed in coplanar relationship with said recesses confronting each other, means forming a cutting edge coextensive with at least a portion of each recess for engaging opposite outer sides of a pipe in scraping relation when the body is disposed at an acute angle with respect thereto, hinge means interconnecting said members at one end to provide outward coplanar pivotal movement thereof for opening said aperture to receive a pipe therewithin and to provide inward coplanar pivotal movement for closing said aperture to operatively engage the outer surface of the pipe, a handle projecting outwardly from the other end of each member for selectively effecting said pivotal movement and for displacing said body in longitudinal reciprocation along the pipe, and means disposed intermediate said aperture and said handles for releasably connecting said members together, so that positive scraping pressure is created between the edges and the surface of the pipe when the body is inclined with respect to the pipe and the handle is urged theretoward while being displaced therealong.

2. A pipe scraper in accordance with claim 1 wherein said hinge means includes a pin carried by one of said members and a yoke mounted on the other member and pivotally connected to said pin to thereby provide said coplanar pivotal movement.

3. A pipe scraper in accordance with claim 2 wherein each member has an abutment surface adjacent the aperture for limiting the inward movement of the members, and said pin is spaced inwardly from said abutment surface on its associated member to thereby permit said aperture to be opened wide.

4. A pipe scraper in accordance with claim 3 wherein said elliptically-shaped aperture has a major axis and said abutment surface is disposed on said axis and said pin is offset therefrom.

5. A pipe scraper in accordance with claim 1 including handle means projecting outwardly from one of said members and transversely to said handles at said other end of the members.

6. A pipe scraper in accordance with claim 1 wherein said body has a pair of opposite sides disposed in spaced parallel planes and said edge has a first scraping portion extending around said aperture at said one end of said body and has a second scraping portion extending around said aperture at said other end of said body, so that when the handle is urged toward the pipe the first and second portions engage opposite outer sides of the pipe in scraping relation.

7. A pipe scraper in accordance with claim 6 wherein said first scraping portion of said scraping edge is coplanar with one side of said body and said second scraping portion of said scraping edge is coplanar with the other side of said body, said portions each being formed by a bevel surface disposed on the side opposite the coplanar side of its respective portion.

8. A pipe scraper in accordance with claim 6 wherein said first and second scraping portions of said scraping edge are located in a common plane intermediate said opposite sides of said body, and each of said portions is formed by two beveled surfaces disposed on said opposite sides of said body.

9. A pipe scraper in accordance with claim 6 wherein said first and second scraping portions each having a scraping edge coplanar with the opposite planar sides of said body, said edges being formed by a surface extending normal to the plane of said body.

References Cited

UNITED STATES PATENTS

| | | | |
|---|---|---|---|
| 647,676 | 4/1900 | Laverack | 15—104.04 |
| 1,456,928 | 5/1923 | Lake. | |

FOREIGN PATENTS

| | | |
|---|---|---|
| 689,837 | 4/1953 | Great Britain. |

EDWARD L. ROBERTS, Primary Examiner

U.S. Cl. X.R.

15—236; 29—81; 81—9.5